(12) United States Patent
Suenaga et al.

(10) Patent No.: US 8,951,635 B2
(45) Date of Patent: Feb. 10, 2015

(54) FERRITE POWDER FOR BONDED MAGNET, METHOD FOR MANUFACTURING FERRITE POWDER, AND BONDED MAGNET USING FERRITE POWDER

(75) Inventors: Shinichi Suenaga, Okayama (JP); Kouji Hirata, Okayama (JP); Satoru Tsuboi, Okayama (JP); Keisuke Ayabe, Okayama (JP); Kazuyosi Horii, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 625 days.

(21) Appl. No.: 13/258,617

(22) PCT Filed: Apr. 9, 2010

(86) PCT No.: PCT/JP2010/056484
§ 371 (c)(1),
(2), (4) Date: Sep. 22, 2011

(87) PCT Pub. No.: WO2010/117070
PCT Pub. Date: Oct. 14, 2010

(65) Prior Publication Data
US 2012/0015189 A1 Jan. 19, 2012

(30) Foreign Application Priority Data

Apr. 9, 2009 (JP) .................................. 2009-095324
Apr. 9, 2010 (JP) .................................. 2010-090184

(51) Int. Cl.
*B32B 5/16* (2006.01)
(52) U.S. Cl.
USPC ...... 428/402; 335/297; 366/162.1; 252/62.54
(58) Field of Classification Search
USPC .................. 428/402; 335/297; 366/162.1; 252/62.54, 62, 54
IPC ........ H01F 1/08,1/11, 1/113; B32B 9/00; B01F 15/04; C01G 49/00
See application file for complete search history.

(56) References Cited

U.S. PATENT DOCUMENTS

| 2004/0212472 | A1 | 10/2004 | Senda et al. | |
|---|---|---|---|---|
| 2007/0131893 | A1* | 6/2007 | Senda et al. | ............ 252/62.54 |
| 2010/0065771 | A1* | 3/2010 | Fujii et al. | ............ 252/62.54 |
| 2010/0295643 | A1* | 11/2010 | Nakaue et al. | ............ 335/297 |

FOREIGN PATENT DOCUMENTS

| EP | 1475352 | * 11/2004 |
|---|---|---|
| EP | 1981044 | * 10/2008 |
| JP | 63-170219 | 7/1988 |
| JP | 03-108302 | 5/1991 |
| JP | 9-106904 | 4/1997 |
| JP | 2001-189210 | 7/2001 |
| JP | 3257936 | 7/2001 |
| JP | 2004-186224 | 7/2004 |
| JP | 2004-327669 | 11/2004 |
| JP | 2005-268729 | 9/2005 |
| JP | 2008-277792 | 11/2008 |
| WO | 2009/041606 | 4/2009 |
| WO | WO2009/041606 | * 4/2009 |

OTHER PUBLICATIONS

Japan Office action, mail date is Nov. 26, 2013.
Search report from E.P.O., mail date is Aug. 31, 2012.

* cited by examiner

*Primary Examiner* — Leszek Kiliman
(74) *Attorney, Agent, or Firm* — Greenblum & Bernstein, P.L.C.

(57) ABSTRACT

A bonded magnet is required to have a large energy product, which is the product of magnetization Br and coercive force Hc. However, in a ferrite powder for a bonded magnet, when the particle diameter is reduced to improve the coercive force, the packing properties are impaired, and the Br is lowered.
When the particle diameter is increased to improve the magnetization, the coercive force is lowered.
Therefore, to increase the energy product, both the Br and Hc must be increased.
A ferrite powder that has a large particle size, is composed of smooth crystals, and suffers only a small reduction in coercive force even after pressurization is obtained by mixing a fine ferrite powder having a small particle size with a ferrite powder calcined at a temperature of 1050° C. to 1300° C. in the presence of a chloride at its saturated vapor pressure and then annealing the mixture at 800° C. to 1100° C.
A bonded magnet produced using the powder has an energy product of 2.0 MGOe or more.

10 Claims, No Drawings

FERRITE POWDER FOR BONDED MAGNET, METHOD FOR MANUFACTURING FERRITE POWDER, AND BONDED MAGNET USING FERRITE POWDER

TECHNICAL FIELD

The present invention relates to a ferrite powder for an anisotropic bonded magnet, to a method for manufacturing the ferrite powder, and to a bonded magnet using the ferrite powder.

BACKGROUND ART

Ferrite-based sintered magnets are used as magnets for, for example, magnet rolls in AV and OA devices and copying machines that are required to have strong magnetic force.

However, such ferrite-based sintered magnets have their specific problems in that cracking and chipping can occur, that their productivity is low since polishing is required, and that processing into a complicated shape is difficult.

In recent years, bonded magnets using rare-earth magnets are used in part of this field.

However, the problems of the rare-earth magnets are that they are about 20 times more expensive than the ferrite-based sintered magnets and rust easily.

Accordingly, there is a demand to replace the ferrite-based sintered magnets with ferrite-based bonded magnets.

However, the maximum energy product BHmax of bonded magnets is lower than those of sintered magnets. Therefore, bonded magnets used as alternatives must be further improved to have higher maximum energy product BHmax.

To improve the maximum energy product BHmax, residual magnetic flux density Br and coercive force Hc must be improved. To improve the former property, it is important to improve the saturation magnetization value $\sigma_s$, filling properties, and orientation properties of ferrite powder. To improve the latter property, it is important to improve crystallinity and to suppress the formation of multi-axis ferrite particles.

Several methods proposed to improve the saturation magnetization value $\sigma_s$ include the use of ferrite powder having a W-type crystal structure or the addition of an additional element (such as a rare-earth element or a cobalt element) to crystals to form a solid solution (Patent Literature 1). However, the range of improvement is limited to several percent. In addition, the production methods are complicated, and an expensive additional element is used, leading to an increase in cost whereas unfortunately, the advantages obtained are not so great. Therefore, the resulting magnets are not enough to replace ferrite-based sintered magnets.

One method proposed to improve the filling properties is to mix two or more types of ferrite powders with different particle diameters so that small particles enter the spaces between large particles. The filling factor is thereby improved (Patent Literature 2).

However, the ferrite powders to be mixed contain a large amount of hexagonal plate-like particles. This is disadvantageous to ensure both the filling properties and flowability of the ferrite powders in the compound, and no sufficient consideration is given to the dispersibility of the ferrite particles.

The flowability greatly affects the kneadability and moldability of the compound, and, in extreme cases, the compound cannot be kneaded or molded.

The flowability affects the final orientation of the ferrite particles in a molded product. Therefore, the reduction in the orientation properties caused by increasing the filling amounts of the ferrite powders must be compensated, and a high orientation magnetic field of 10 kOe or more must be used during molding. The use of a large-scale molding apparatus can, of course, result in an increase in production cost, and therefore this method is also not enough to replace ferrite-based sintered magnets.

The orientation properties are greatly affected by the flowability of a compound, as described above.

The flowability is also greatly affected by the resin and surface treatment agent used for the compound. However, it is advantageous for the ferrite powder to include a small amount of particles having a hexagonal plate-like shape, which is a typical shape of a highly crystalline ferrite powder, and for the particles of the ferrite powder to have high dispersibility and a small specific surface area (a large particle size).

However, if the particle size is large, magnetic domain walls are easily formed to form multi-axis particles, and this results in a reduction in coercive force, so that the particle size cannot be simply increased.

To improve the coercive force, it is advantageous to improve crystallinity and reduce the particle size so that the formation of multi-axis particles can be suppressed.

However, if annealing temperature is increased to improve the crystallinity, aggregation (sintering) may proceed to reduce the dispersibility.

If the particle size is reduced, the flowability is lowered. Therefore, it is difficult to improve the coercive force Hc while the residual magnetic flux density Br is maintained.

CITATION LIST

Patent Literature

Patent Literature 1: Japanese Patent Application Laid-Open No. 2001-189210
Patent Literature 2: Japanese Patent No. 3257936

SUMMARY OF INVENTION

Problems to be Solved by the Invention

It is an object to provide a ferrite powder for an anisotropic bonded magnet that has improved crystallinity and dispersibility and also has controlled-particle shapes, so that the ferrite powder has good filling properties and orientation properties while coercive force is ensured and thereby allows production of a bonded magnet having high magnetic force.

Means for Solving the Problems

The present invention has been devised to achieve the above object. More specifically, a ferrite powder for an anisotropic bonded magnet of the invention is prepared by mixing ferrite powders that have a particle diameter distribution with a plurality of peaks. The ferrite powder for an anisotropic bonded magnet has a compressed density (CD) of 3.5 g/cm³ or more and a specific surface area (SSA) of 2.0 m²/g or less, and intrinsic coercive force of compression moulding (p-iHc) of the ferrite powder is 2100 Oe or more.

The present invention also provides a ferrite powder for an anisotropic bonded magnet, the ferrite powder having a melt flow rate of 80 g/10 min or more as measured by a flowability test in which 92 percent by weight of the ferrite powder is used.

The present invention also provides an anisotropic bonded magnet that has coercive force (inj-iHc) of 2100 Oe or more and a maximum energy product (inj-BHmax) of 2.2 MGOe or more even when a low magnetic field of 4.3 kOe has been used for orientation.

The present invention also provides a method for manufacturing a ferrite powder for an anisotropic bond, the method comprising the steps of:

granulating a plurality of raw materials including iron oxide to obtain a granulated product;

calcining the granulated product at a temperature of 1050° C. or more and 1300° C. or less in an atmosphere containing a chloride at its vapor pressure to obtain a calcined product; and crushing or pulverizing the calcined product to obtain the powder.

The present invention also provides a method for manufacturing a ferrite powder for an anisotropic bonded magnet, the method comprising the following steps of:

(1) granulating a plurality of raw materials including iron oxide to obtain a first granulated product;

(2) calcining the first granulated product at a temperature of 1050° C. or more and 1300° C. or less in an atmosphere containing a chloride at its saturated vapor pressure to obtain a first calcined product;

(3) crushing or pulverizing the first calcined product to obtain a first powder; and (4) annealing a powder mixture in an air atmosphere at 800° C. or more and 1100° C. or less, the method further comprising the step of mixing a second powder having a specific surface area different from that of the first powder before, after, or during the step of crushing or the step of annealing to obtain the powder mixture.

Advantageous Effects of Invention

The ferrite powder for an anisotropic bonded magnet of the present invention satisfies that the compressed density (CD) of the ferrite powder is 3.5 g/cm$^3$ or more and the intrinsic coercive force of compression moulding (p-iHc) of the ferrite powder is 2100 Oe or more.

With the ferrite powder for an anisotropic bonded magnet of the present invention, an anisotropic bonded magnet having coercive force (inj-iHc) of 2100 Oe or more and a maximum energy product (inj-BHmax) of 2.2 MGOe or more can be obtained.

DESCRIPTION OF EMBODIMENTS

A ferrite powder for an isotropic bonded magnet (hereinafter may be simply referred to as a "bonded magnet") of the present invention has the following properties.

These properties will next be described.

The compressed density (CD) is said to bean index indicating the amount of ferrite particles being the minimum constituent units of a bonded magnet that can fill a limited volume and is closely correlated with the saturation magnetic flux density (Bs).

When the compressed density (CD) is high, the volume of the spaces between the particles is small, and therefore the amount of resin that enters the spaces decreases apparently.

The proportion of the amount of the resin that can move freely and contributes to cushioning between the particles is increased accordingly, and the flowability during kneading and molding is increased, so that the effect of improving the orientation properties is obtained.

Therefore, the higher the compressed density (CD), the better. The compressed density (CD) is preferably 3.55 g/cm$^3$ or more, and more preferably 3.6 g/cm$^3$ or more.

One conventional method used to improve the compressed density (CD) is to mix ferrite powders with different particle diameters.

The present invention can also be achieved by mixing ferrite powders with a plurality of different particle diameters.

Therefore, the ferrite powder for an anisotropic bonded magnet of the present invention has a plurality of peak in its particle size distribution.

When a particle size distribution with a plurality of peaks can be obtained, it is unnecessary to mix a plurality of ferrite powders. More specifically, a ferrite powder produced such that its particle size distribution has a plurality of peaks during synthesis may be used.

The maximum values of the peaks may not be completely independent from each other. If a peak has a tail with a shoulder, the shoulder is considered as another peak.

The intrinsic coercive force of compression moulding (p-iHc) is coercive force after the compression moulding has been compressed at a high pressure of 2 ton/cm$^2$ and has experienced a mechanical stress history.

The term "ton" means 1000 kg.

Generally, when a bonded magnet is produced, mechanical stress is applied during kneading and molding, and the coercive force is lowered (more than that of the powder in a stress-free state). The intrinsic coercive force of compression moulding (p-iHc) is closely correlated with the coercive force (inj-iHc) of a bonded magnet (molded product) and therefore can be used as an effective index for estimating the coercive force (inj-iHc) of the bonded magnet (molded product).

Therefore, the higher the intrinsic coercive force of compression moulding (p-iHc), the better. However, an excessively high coercive force may causes difficulty in magnetization. Therefore, the coercive force is preferably 2200 Oe or more and 3200 Oe or less.

The ferrite powder for an anisotropic bonded magnet of the present invention satisfies that the specific surface area (SSA) is 2.0 m$^2$/g or less.

If the specific surface area (SSA) is high, the amount of a resin (binder) adsorbing to the surfaces of the ferrite particles during kneading and molding is large, and the proportion of the amount of freely movable resin is reduced accordingly. This leads to a reduction in flowability.

The reduction in flowability results in a reduction in the orientation properties during molding in a magnetic field, i.e., a reduction in residual magnetic flux density (Br).

This tendency becomes more prominent as the ratio of the amount of ferrite powder in a compound (an FC ratio) increases and as the orientation magnetic field during magnetic field molding decreases. Therefore, the lower the specific surface area, the better. Preferably, the specific surface area is 1.8 m$^2$/g or less.

The ferrite powder for an anisotropic bonded magnet of the present invention has a high compressed density (CD) and a low specific surface area (SSA) and includes ferrite particles that have improved dispersibility and are reduced in the amount of plate-like particles, and high flowability can thereby be obtained. As described above, high flowability leads to the improvement of the orientation properties during molding in a magnetic field, i.e., the improvement of the residual magnetic flux density (Br), and therefore the upper limit of the flowability is not particularly set. The melt flow rate (MFR) of a compound containing 92 percent by weight of the ferrite powder is 80 g/10 min or more, and preferably 100 g/10 min or more.

In the present invention, kneaded pellets mean a product obtained by pulverizing the compound and having an average particle diameter of about 2 mm.

The ferrite powder for an anisotropic bonded magnet of the present invention satisfies that the saturation magnetization value (σs) in a non-oriented state is 54 emu/g.

Since the saturation magnetization value (σs) is strongly correlated with the saturation magnetic flux density (Bs), the higher the saturation magnetization value, the better. The saturation magnetization value is preferably 55 emu/g or more, and more preferably 56 emu/g or more.

The ferrite powder for an anisotropic bonded magnet of the present invention may contain a rare-earth element or a transition metal element (such as cobalt) (i.e., may form a solid solution therewith), for the purpose of further improving magnetic properties.

However, the addition of such a rare-earth element or a transition metal element (such as cobalt) directly results in an increase in cost.

For example, 10 at % of strontium or barium, which are relatively inexpensive rare-earth elements, is used to form a solid solution, the material cost increases by 20% or more.

Since the greatest advantage of a ferrite powder (bonded magnet) is its low cost, it is important that the increase in cost is 20% or less and preferably 10% or less. More preferably, the cost does not increase.

Therefore, to avoid an increase in cost, the content of a rare-earth element or a transition metal element is 10 at % or less, preferably at % or less, and more preferably 0 at % (except for the amounts included as unavoidable impurities).

The ferrite powder for an anisotropic bonded magnet of the present invention has good crystallinity, and the ratio of the amount of plate-like particles therein is small. Therefore, a reduction in the coercive force due to mechanical stress is small. Even in a high-filling factor compound containing 92 percent by weight of the ferrite powder, a reduction in the coercive force due to mechanical stress is small during kneading and molding when a bonded magnet is produced, and the molded product satisfies that its coercive force (inj-iHc) is 2100 Oe or more.

As in the intrinsic coercive force of compression moulding (p-iHc), the higher the coercive force of the molded product, the better. However, excessively high coercive force causes a difficulty in magnetization. Therefore, the coercive force (inj-iHc) of the molded product is also preferably 2200 Oe or more and 3200 Oe or less.

There are conventional ferrite powders that satisfy any two or three of the following properties: compressed density (CD), intrinsic coercive force of compression moulding (p-iHc), specific surface area (SSA), saturation magnetization value (σs) in a non-oriented state, and melt flow rate (MFR). However, there is no ferrite powder that satisfies all these properties.

In the present invention, all these properties are satisfied. Therefore, even when the filling factor is high, i.e., the content of the ferrite powder is 92 percent by weight, high Hc and Br can be obtained by molding in a low orientation magnetic field of 4.3 kOe. A high energy product of 2.2 MGOe or more can thereby be obtained.

In the method for manufacturing a ferrite powder for an anisotropic bonded magnet of the present invention, calcining is performed at a temperature of 1050° C. or more and 1300° C. or less in the presence of a chloride, in particular KCl, at its vapor pressure. Although the particles grow, the distances between the particles are maintained.

Therefore, a ferrite powder can be obtained in which the ratio of plate-like particles is small and inter-particle sintering is reduced and which has a small specific surface area and high crystallinity.

Examples of the chloride include KCl, NaCl, LiCl, RbCl, CsCl, $BaCl_2$, $SrCl_2$, $CaCl_2$, and $MgCl_2$. A combination of two or more of them may be used.

In addition to the chloride, an oxide, an inorganic acid, or a salt of an inorganic acid may be used as a flux for calcining. Examples of the oxide, the inorganic acid, and the salt thereof include bismuth oxide, boric acid, borates, sulfates, phosphates, silicic acid, and silicates. A combination of two or more of them may be used.

It is difficult to directly measure the vapor pressure (partial pressure) of the chloride during calcining. Therefore, the vapor pressure is computed from the presence or absence of the remaining chloride after calcining, the airtightness and volume of a calcining furnace (container), and the saturated vapor pressure at the calcination temperature.

More specifically, the vapor pressure of the chloride during calcining is determined by regression computation using chemical handbook data (Table 1).

The partial pressure of the chloride is 50 mmHg or more and 760 mmHg or less and preferably 50 mmHg or more and the saturated vapor pressure or less. It is important that the chloride is always present as vapor during calcining (when the calcination temperature is maintained).

TABLE 1

| VAPOR PRESSURE [mmHg] | TEMPERATURE [° C.] | | | |
|---|---|---|---|---|
| | KCl | NaCl | LiCl | MgCl2 |
| 1 | 821 | 865 | 783 | 778 |
| 5 | 919 | 967 | 880 | 877 |
| 10 | 968 | 1017 | 932 | 930 |
| 20 | 1020 | 1072 | 987 | 988 |
| 60 | 1115 | 1169 | 1081 | 1088 |
| 100 | 1164 | 1220 | 1129 | 1142 |
| 200 | 1239 | 1296 | 1203 | 1223 |
| 400 | 1322 | 1379 | 1290 | 1316 |
| 760 | 1407 | 1465 | 1382 | 1418 |

A ferrite powder satisfying the characteristic conditions for the compressed density (CD), the intrinsic coercive force of compression moulding (p-iHc), and the specific surface area (SSA) can be obtained by mixing this ferrite powder with another ferrite powder having a specific surface area different from that of the former ferrite powder and calcining the powder mixture.

Preferably, a ferrite powder having a specific surface area of 8 $m^2$/g or less is used as the another ferrite powder having a different specific surface area so that the specific surface area of the final ferrite powder is not excessively high.

The methods for measuring the powder properties of the ferrite powder produced in this embodiment will be described.

<Specific Surface Area>

The specific surface area (SSA) of the ferrite powder was measured using MONOSORB (product of YUASA-IONICS Co., Ltd.) according to the BET method.

<Particle Size Distribution>

The particle size distribution of the ferrite powder was measured using a dry-type laser diffraction particle size distribution measurement apparatus (HELOS & RODOS, product of Japan Laser Corp.) under the conditions of a focal length of 20 mm, a dispersion pressure of 5.0 bar, and a suction pressure of 130 mbar.

Three measurement points near a local maximum in a frequency distribution curve were approximated by a quadratic function, and the particle size at the local maximum of the quadratic function was used as a peak particle diameter.

<Compressed Density (CD)>

The compressed density of the ferrite powder was measured as follows. 10 g of the ferrite powder was filled into a cylindrical mold having an inner diameter φ of 2.54 cm and was then compressed at a pressure of 1 ton/cm².

The density of the compressed ferrite powder was measured as its compressed density.

<Ratio of Plate-Like Particles>

The ratio of plate-like particles in the ferrite powder was measured by the following procedure.
(1) 4.5 g of the ferrite powder was dispersed in 5.7 g of NC clear lacquer using a centrifugal ball mill (product name: PULNERISETTE type 702, product of FRITSCH).
(2) The dispersed coating was applied to a sheet using an applicator bar, and then an orientation magnetic field of 5 kOe was applied parallel to the coated surface to orient the ferrite particles (the c-axis direction of the ferrite particles is aligned parallel to the coated surface, so that the diameter of the particles in the c-axis direction can be measured by observing the particles from directly above the coated surface).
(3) The dried sheet was observed under a scanning electron microscope (JSM-T220A, product of JEOL), and 100 or more particles in a 2000×SEM photograph were measured for their major-axis diameters (diameters orthogonal to the c-axis) and minor-axis diameters (lengths along the c-axis).
(4) Particles with the major-axis diameter/minor-axis diameter=2 or more were defined as plate-like particles, and the ratio of the plate-like particles was computed.

<Bulk Density of Calcined Product>

About 180 mL of a calcined product was placed in a 200 mL graduated cylinder, and the bulk density of the calcined product was computed from the weight of the calcined product and the reading on the graduated cylinder.

<Magnetic Properties>

The magnetic properties of the ferrite powder were determined using VSM (VSM P-7-15, product of TOEI INDUSTRY Co., Ltd.) as follows. A cell for the device was filled with 20 mg of the ferrite powder and 30 mg of paraffin, and the mixture was excessively heated at 80° C. to melt the paraffin. Then the mixture was cooled to room temperature to fix the sample particles randomly. Measurement was performed in a measurement magnetic field of 10 kOe, and σs (emu/g) and iHc (Oe) were computed.

Note that 1 Oe is ¼ π×10³ [A/m].

<Magnetic Properties of Green Compact>

The intrinsic coercive force of compression moulding (p-iHc) of the ferrite powder was measured by the following procedure.
(1) 8 g of the ferrite powder and 0.4 cc of a polyester resin (P-resin, product of Nichika Inc.) were kneaded in a mortar.
(2) A mold with an inner diameter φ of 15 mm was filled with 7 g of the kneaded product, and the kneaded product was compressed under a pressure of 2 ton/cm² for 40 minutes.
(3) The molded product was removed from the mold and dried at 150° C. for 30 minutes, and measurement was performed using a BH tracer (TRF-5BH, product of TOEI INDUSTRY Co., Ltd.) in a measurement magnetic field of 10 kOe.

<Melt Flow Rate>

The melt flow rate (MFR) of kneaded pellets was determined as follows; The kneaded pellets were supplied to a melt flow indexer (melt flow indexer C-5059D2 (according to JIS K-7210), product of Toyo Seiki Seisaku-sho, Ltd.), and the weight extruded under a load of 10 kg at 270° C. were measured. The measured weight was converted to the amount extruded per 10 minutes to determine the melt flow rate (unit: g/10 min).

In the present description, the melt flow rate is a value measured by the following steps (1) to (3).
(1) 91.7 Parts by weight of the magnetic powder to be measured, 0.8 parts by weight of a silane coupling agent, 0.8 parts by weight of a lubricant, and 6.7 parts by weight of nylon-6 (powder form) are mixed in a mixer.
(2) The obtained mixture is kneaded at 230° C. to form pellets (a pulverized product of the compound) having an average diameter of 2 mm.
(3) The pellets obtained in the above (2) are supplied to a melt flow indexer, and the weight extruded under a load of 10 kg at 270° C. in 10 minutes is measured and used as the melt flow rate (unit: g/10 min).

<Magnetic Properties of Molded Product>

The magnetic properties of a molded product were evaluated by the following procedures.
(1) The kneaded pellets were injection-molded using an injection molding apparatus (product of Sumitomo Heavy Industries, Ltd.) in a magnetic field of 4.3 kOe at a temperature of 290° C. and a molding pressure of 8.5 N/mm² to obtain a cylindrical molded product having a diameter of 15 mm and a height of 8 mm (the orientation direction of the magnetic field is along the center axis of the cylinder).
(2) The magnetic properties of the cylindrical molded product were measured using a BH tracer (TRF-5BH, product of TOEI INDUSTRY Co., Ltd.) in a measurement magnetic field of 10 kOe.

EXAMPLE 1

(1) Production of Powder A

Iron oxide and strontium carbonate were weighed in a molar ratio of iron oxide 5.9: strontium carbonate 1.

0.18 Percent by weight of boric acid and 2.44 percent by weight of potassium chloride were added to the weighed materials and then mixed together. The mixture was granulated with water into a spherical shape with a diameter of 3 to 10 mm, and the granulated product was dried in air at 150° C.

200 g of the granulated product was placed in an alumina-made container having a volume of 0.68 L (in an air atmosphere). After the container was covered with an alumina-made lid, calcining was performed in an electric furnace at 1245° C. for 80 minutes to obtain a calcined product.

The bulk density of the calcined product was 1.6 g/cm³, and it was found that almost no calcining of the particles proceeded.

The alumina container used had a structure designed such that, when the inner pressure increased due to volatile gas in the raw materials, the gas escaped through the gap between the lid and the container so that the inner pressure was always maintained at 1 atm during calcining.

Since the amount of potassium chloride is large enough relative to the volume of the container, the equilibrium state at the saturated vapor pressure of potassium chloride is considered to be maintained during calcining. Therefore, the partial pressure of potassium chloride during calcining is estimated to be 210 mmHg (obtained by regression computation using the chemical handbook data), which is the saturated vapor pressure of potassium chloride at 1245° C.

550 mmHg obtained by subtracted the vapor pressure of potassium chloride from 1 atm (760 mmHg) is considered to be the total pressure of air and carbon dioxide generated from strontium carbonate. The partial pressure of carbon dioxide and the partial pressure of oxygen are computed to be 476 mmHg and 15 mmHg, respectively, from the amount of air remaining in the container (0.68 L (STP)) and the amount of carbon dioxide generated (4.4 L (STP)).

The calcined product was processed using a hammer mill (Eck sample mill type KII, product of Fuji Paudal Co., Ltd.) to obtain a coarsely pulverized powder.

The coarsely pulverized powder was pulverized using a planetary ball mill (product name: PULNERISETTE type07-301, product of FRITSCH). The pulverization using the planetary mill was repeated until a sufficient amount of powder A necessary for particle synthesis was obtained. Then the entire amount of the slurry was filtrated, and the obtained cake was dried in air at 150° C. for 10 hours. The dried cake was pulverized using a mixer (product name: sample mill SK-M10, product of Kyoritsu Riko K. K.) to obtain the powder A.

The obtained powder A had a peak particle diameter (Helos) of 5.3 µm, a specific surface area (SSA) of 0.7 $m^2/g$, a σs of 56.5 emu/g, and an Hc of 1490 Oe.

SEM observation results showed that the ratio of plate-like particles was 25%, and therefore the amount of the plate-like particles was found to be small.

It was also found by X-ray diffraction that the powder A had the magnetoplumbite ferrite crystal structure.

(2) Production of Powder B

Iron oxide and strontium carbonate were weighed in a molar ratio of iron oxide 5.5: strontium carbonate 1 and mixed together. Then the mixture was granulated into a spherical shape with a diameter of 3 to 10 mm, and the granulated product was dried in air at 150° C.

200 g of the granulated product was placed in an alumina-made container having a volume of 0.68 L and was calcined in an electric furnace in air at 1070° C. for 80 minutes to obtain a calcined product. The calcined product was processed by a hammer mill to obtain a coarsely pulverized powder.

The coarsely pulverized powder was pulverized by a planetary ball mill. The pulverization using the planetary ball mill was repeated until an amount of powder B required for particle synthesis was obtained. Then the entire amount of the slurry was filtrated, and the obtained cake was dried in air at 150° C. for 10 hours. The dried cake was pulverized using a mixer to obtain the powder B.

The obtained powder B had a peak particle diameter of 1.1 µm, a specific surface area of 6.8 $m^2/g$, a σs of 54.4 emu/g, and an Hc of 2,570 Oe.

It was found by X-ray diffraction that the powder B had the magnetoplumbite ferrite crystal structure.

(3) Production of Powder Mixture (Ferrite Powder)

The powder A (70 parts by weight) obtained in the above (1), the powder B (30 parts by weight) obtained in the above (2), and tap water (150 parts by weight) were weighed and placed in a container provided with stirring blades to mix and stir the mixture. The slurry was filtrated and dried (in air at 150° C. for 10 hours), and the dried cake was pulverized by a mixer.

The powder mixture was annealed in an electric furnace in air at 970° C. for 30 minutes to obtain a ferrite particle in Example 1.

The obtained ferrite powder had two peak particle diameters of 1.2 µm and 5.7 µm, a specific surface area of 1.5 $m^2/g$, a compressed density of 3.63 $g/cm^3$, a σs of 56.8 emu/g, an Hc of 3430 Oe, and a p-iHc of 2350 Oe. The specific surface area was found to be low, and a sufficient compressed density and a sufficient p-iHc were found to be ensured.

EXAMPLE 2

A ferrite powder according to Example 2 was obtained by repeating the same procedure as in Example 1 except that the calcination temperature in the production of the powder A in Example 1 was changed to 1260° C.

The partial pressures of the respective gas components during calcining were computed to be 250 mmHg for potassium chloride, 442 mmHg for carbon dioxide, and 14 mmHg for oxygen, and the bulk density of the calcined product was 1.6 $g/cm^3$.

The obtained powder A had a peak particle diameter of 6.7 µm, a specific surface area of 0.6 $m^2/g$, a σs of 56.5 emu/g, and an Hc of 1210 Oe, and the ratio of plate-like particles was 24%.

The obtained ferrite powder had peak particle diameters of 1.3 µm and 6.8 µm, a specific surface area of 1.5 $m^2/g$, a compressed density of 3.69 $g/cm^3$, a σs of 56.5 emu/g, an Hc of 3430 Oe, and a p-iHc of 2230 Oe. The specific surface area was found to be low, and a sufficient compressed density and a sufficient p-iHc were found to be ensured.

EXAMPLE 3

A ferrite powder according to Example 3 was obtained by repeating the same procedure as in Example 1 except that the calcination temperature in the production of the powder A in Example 1 was changed to 1230° C.

The partial pressures of the respective gas components during calcining were computed to be 190 mmHg for potassium chloride, 494 mmHg for carbon dioxide, and 16 mmHg for oxygen, and the bulk density of the calcined product was 1.5 $g/cm^3$.

The obtained powder A had a peak particle diameter of 5.2 µm, a specific surface area of 0.9 $m^2/g$, a σs of 56.5 emu/g, and an Hc of 1590 Oe, and the ratio of plate-like particles was 19%.

The obtained ferrite powder had peak particle diameters of 1.3 µm and 5.1 µm, a specific surface area of 1.4 $m^2/g$, a compressed density of 3.58 $g/cm^3$, a σs of 55.7 emu/g, an Hc of 3760 Oe, and a p-iHc of 2620 Oe. The specific surface area was found to be low, and a sufficient compressed density and a sufficient p-iHc were found to be ensured.

EXAMPLE 4

A ferrite powder according to Example 4 was obtained by repeating the same procedure as in Example 1 except that the potassium chloride used for the production of the powder A in Example 1 was changed to sodium chloride.

The partial pressures of the respective gas components during calcining were computed to be 80 mmHg for sodium chloride, 589 mmHg for carbon dioxide, and 19 mmHg for oxygen, and the bulk density of the calcined product was 1.6 $g/cm^3$.

The obtained powder A had a peak particle diameter of 5.1 µm, a specific surface area of 1.1 $m^2/g$, a σs of 56.4 emu/g, and an Hc of 1510 Oe, and the ratio of plate-like particles was 21%.

The obtained ferrite powder had peak particle diameters of 1.4 µm and 5.3 µm, a specific surface area of 1.3 $m^2/g$, a compressed density of 3.57 $g/cm^3$, a σs of 56.2 emu/g, an Hc of 3880 Oe, and a p-iHc of 2740 Oe. The specific surface area was found to be low, and a sufficient compressed density and a sufficient p-iHc were found to be ensured.

EXAMPLE 5

A ferrite powder according to Example 5 was obtained by repeating the same procedure as in Example 2 except that the potassium chloride used for the production of the powder A in Example 2 was changed to sodium chloride.

The partial pressures of the respective gas components during calcining were computed to be 150 mmHg for sodium chloride, 528 mmHg for carbon dioxide, and 17 mmHg for oxygen, and the bulk density of the calcined product was 1.8 g/cm$^3$.

The obtained powder A had a peak particle diameter of 6.3 μm, a specific surface area of 0.8 m$^2$/g, a σs of 56.5 emu/g, and an Hc of 1330 Oe, and the ratio of plate-like particles was 28%.

The obtained ferrite powder had peak particle diameters of 1.2 μm and 6.5 μm, a specific surface area of 1.2 m$^2$/g, a compressed density of 3.61 g/cm$^3$, a σs of 56.8 emu/g, an Hc of 3150 Oe, and a p-iHc of 2130 Oe. The specific surface area was found to be low, and a sufficient compressed density and a sufficient p-iHc were found to be ensured.

EXAMPLE 6

A granulated product was obtained by repeating the same procedure as in Example 1 except that the potassium chloride used for the production of the powder A in Example 1 was not mixed. An alumina-made boat on which 35 g of the granulated product was placed and 0.85 g of potassium chloride (2.43 percent by weight with respect to the granulated product) were placed in a tubular furnace having a volume of 1.0 L, and calcining was performed at 1260° C. for 80 minutes (without introduction of gas from the outside) to obtain a calcined product.

Note that the tubular furnace used had a structure designed such that the entire volume of 1.0 L (inner diameter φ: 85 mm, tube length: 200 mm) of the tube of the tubular furnace was heated. Gas introduction (discharge) tubes with an inner diameter of 5 mm were attached to opposite ends of the tube. When the inner pressure inside the tubular furnace increased, the gas escaped to the outside through the gas introduction tubes.

Since the amount of potassium chloride is large enough relative to the volume of the tubular furnace, the partial pressure of potassium chloride during calcining is estimated to be 250 mmHg, which is the saturated vapor pressure of potassium chloride at 1260° C., as in Example 2.

510 mmHg obtained by subtracting the vapor pressure of potassium chloride from 1 atm (760 mmHg) can be considered to be the total pressure of air and carbon dioxide generated from strontium carbonate. The partial pressure of carbon dioxide and the partial pressure of oxygen are computed to be 222 mmHg and 60 mmHg, respectively, from the amount of air remaining in the container (1.0 L (STP)) and the amount of carbon dioxide generated (0.77 L (STP)). The bulk density of the calcined product was 1.6 g/cm$^3$.

The step of pulverizing the calcined product and the subsequent steps were the same as those in Example 1. By performing these steps, a ferrite powder according to Example 6 was obtained. The obtained powder A had a peak particle diameter of 6.8 μm, a specific surface area of 0.7 m$^2$/g, a σs of 56.6 emu/g, and an Hc of 1410 Oe, and the ratio of plate-like particles was 16%.

The obtained ferrite powder had peak particle diameters of 1.3 μm and 6.8 μm, a specific surface area of 1.4 m$^2$/g, a compressed density of 3.62 g/cm$^3$, a σs of 56.3 emu/g, an Hc of 3400 Oe, and a p-iHc of 2230 Oe. The specific surface area was found to be low, and a sufficient compressed density and a sufficient p-iHc were found to be ensured.

EXAMPLE 7

A granulated product containing no potassium chloride was obtained by repeating the same procedure as in Example 6. An alumina-made boat on which 35 g of the granulated product was placed and an alumina-made crucible in which 150 g of potassium chloride was placed were placed in a tubular furnace (volume: 1.0 L) as described in Example 6. Calcining was performed at 1260° C. for 80 minutes while air was introduced at 0.2 L/min from the side close to the crucible for potassium chloride to thereby obtain a calcined product.

The crucible in the tubular furnace was observed after calcining, and potassium chloride remained present.

The step of pulverizing the calcined product and the subsequent steps were the same as those in Example 1. By performing these steps, a ferrite powder according to Example 7 was obtained. Since it is considered that the amount of potassium chloride was large enough during calcining, the partial pressure of potassium chloride during calcining is estimated to be 250 mmHg, which is the saturated vapor pressure of potassium chloride at 1260° C., as in Example 2.

Since the air was allowed to flow inside the tubular furnace during calcining, it is assumed that carbon dioxide generated from strontium carbonate was discharged to the outside of the tubular furnace and that the concentration of carbon dioxide present inside the tubular furnace was comparable to the concentration of carbon dioxide in air (approximately 0.03%).

Therefore, the partial pressures of the respective gas components during calcining were computed to be 250 mmHg for potassium chloride, 0 mmHg for carbon dioxide, and 110 mmHg for oxygen, and the bulk density of the calcined product was 1.7 g/cm$^3$.

The obtained powder A had a peak particle diameter of 6.8 μm, a specific surface area of 0.7 m$^2$/g, a σs of 56.4 emu/g, and an Hc of 1420 Oe, and the ratio of plate-like particles was 18%.

The obtained ferrite powder had peak particle diameters of 1.3 μm and 6.8 μm, a specific surface area of 1.5 m$^2$/g, a compressed density of 3.61 g/cm$^3$, a σs of 56.6 emu/g, an Hc of 3380 Oe, and a p-iHc of 2210 Oe. The specific surface area was found to be low, and a sufficient compressed density and a sufficient p-iHc were found to be ensured.

EXAMPLE 8

A ferrite powder according to Example 8 was obtained by repeating the same procedure as in Example 1 except that the wet pulverization used for the production of the powder A in Example 1 was performed using a sand grinder (¼ G1H 146, product of Igarashi Kikai Seizou Kabushiki Kaisha.).

The obtained powder A had a peak particle diameter of 5.0 μm, a specific surface area of 0.8 m$^2$/g, a σs of 55.6 emu/g, and an Hc of 1760 Oe, and the ratio of plate-like particles was 11%.

The obtained ferrite powder had peak particle diameters of 1.3 μm and 4.7 μm, a specific surface area of 1.5 m$^2$/g, a compressed density of 3.59 g/cm$^3$, a σs of 56.0 emu/g, an Hc of 3730 Oe, and a p-iHc of 2570 Oe. The specific surface area was found to be low, and a sufficient compressed density and a sufficient p-iHc were found to be ensured.

EXAMPLE 9

A ferrite powder according to Example 9 was obtained by repeating the same procedure as in Example 1 except that the wet pulverization used for the production of the powder A in Example 1 was performed using a pearl mill (star mill AMS1, product of Ashizawa Finetech Ltd.).

The obtained powder A had a peak particle diameter of 5.3 μm, a specific surface area of 0.9 m²/g, a σs of 55.9 emu/g, and an Hc of 1720 Oe, and the ratio of plate-like particles was 23%.

The obtained ferrite powder had peak particle diameters of 1.2 μm and 5.4 μm, a specific surface area of 1.8 m²/g, a compressed density of 3.56 g/cm³, a σs of 56.1 emu/g, an Hc of 3580 Oe, and a p-iHc of 2320 Oe. The specific surface area was found to be low, and a sufficient compressed density and a sufficient p-iHc were found to be ensured.

EXAMPLE 10

A ferrite powder according to Example 10 was obtained by repeating the same procedure as in Example 1 except that the unannealed powder mixture in Example 1 was processed using a vibratory ball mill (Uras Vibrator KEC-8-YH, product of MURAKAMI SEIKI MFG., Co., Ltd.) and was then annealed.

The obtained ferrite powder had peak particle diameters of 1.3 μm and 3.4 μm, a specific surface area of 1.6 m²/g, a compressed density of 3.62 g/cm³, a σs of 57.1 emu/g, an Hc of 3530 Oe, and a p-iHc of 2600 Oe. The specific surface area was found to be low, and a sufficient compressed density and a sufficient p-iHc were found to be ensured.

Example 11

A ferrite powder according to Example 11 was obtained by repeating the same procedure as in Example 8 except that the unannealed powder mixture in Example 8 was processed using a vibratory ball mill (Uras Vibrator KEC-8-YH, product of MURAKAMI SEIKI MFG., Co., Ltd.) and was then annealed.

The obtained ferrite powder had peak particle diameters of 1.5 μm and 3.6 μm, a specific surface area of 1.7 m²/g, a compressed density of 3.60 g/cm³, a σs of 56.5 emu/g, an Hc of 3530 Oe, and a p-iHc of 2590 Oe. The specific surface area was found to be low, and a sufficient compressed density and a sufficient p-iHc were found to be ensured.

COMPARATIVE EXAMPLE 1

A ferrite powder according to Comparative Example 1 was obtained by repeating the same procedure as in Example 1 except that the alumina container used for the production of the powder A in Example 1 was not covered with a lid during calcining. The partial pressures of the respective gas components during calcining were computed to be 0 mmHg for potassium chloride, 0 mmHg for carbon dioxide, and 160 mmHg for oxygen, and the bulk density of the calcined product was 2.4 g/cm³.

The obtained powder A had a peak particle diameter of 10.6 μm, a specific surface area of 0.9 m²/g, a σs of 54.8 emu/g, and an Hc of 1520 Oe.

SEM observation results showed that a large number of aggregated particles greater than 10 μm were found. Since a large number of the particles were aggregated, the minor-axis diameters were difficult to measure, and the ratio of plate-like particles could not be computed.

The obtained ferrite powder had peak particle diameters of 1.3 μm and 11.0 μm, a specific surface area of 2.0 m²/g, a compressed density of 3.42 g/cm³, a σs of 55.9 emu/g, an Hc of 3250 Oe, and a p-iHc of 2460 Oe. Although the specific surface area was low and a sufficient p-iHc was ensured, the compressed density was found to be low.

COMPARATIVE EXAMPLE 2

A ferrite powder according to Comparative Example 2 was obtained by repeating the same procedure as in Comparative Example 1 except that the pulverization processing by the planetary ball mill in the production of the powder A in Comparative Example 1 was replaced with pulverization processing using a wet mill (WM). The obtained powder A had a peak particle diameter of 4.8 μm, a specific surface area of 1.9 m²/g, a σs of 55.1 emu/g, and an Hc of 1220 Oe.

SEM observation results showed that a large number of fine particles equal to or smaller than sub-micron size were found to be present. These particles had acute corners and were considered to be generated during pulverization.

Since a large number of fine particles equal to or smaller than sub-micron size were observed, the ratio of plate-like particles was computed after these fine particles equal to or smaller than sub-micron size were removed. The result showed that the ratio of plate-like particles was 67%, and a large number of plate-like particles were found to be present.

In the wet pulverizer and the wet mill (WM), a hard pulverizing medium such as zircon and a material to be pulverized are placed in a container, and a stirring rod to which a plurality of rods are connected to its rotation shaft is rotated in the medium to be pulverized to pulverize the medium.

The obtained ferrite powder had peak particle diameters of 1.3 μm and 5.8 μm, a specific surface area of 2.3 m²/g, a compressed density of 3.46 g/cm³, a σs of 55.6 emu/g, an Hc of 3330 Oe, and a p-iHc of 2600 Oe.

Although a sufficient p-iHc was ensured, the specific surface area was high because a large number of fine particles equal to or less than sub-micron size remained present. Since the fine particles equal to or less than sub-micron size served as a sintering promoter during annealing to facilitate the aggregation (sintering) of the particles, a sufficient compressed density could not be ensured.

COMPARATIVE EXAMPLE 3

0.18 Percent by weight of boric acid used for the production of the powder A in Example 1 was changed to 2.1 percent by weight of sodium metaborate tetrahydrate ($NaBO_2 \cdot 4H_2O$), and the amount of potassium chloride was changed to 2.1 percent by weight. Calcining was performed in air at 1,200° C. for 2 hours without covering the alumina container for calcining with a lid, and the calcined product was pulverized using a wet mill (WM).

The rest of the procedure performed was the same as that in Example 1, and a ferrite powder according to Comparative Example 3 was thereby obtained.

The partial pressures of the respective gas components during calcining were computed to be 0 mmHg for potassium chloride, 0 mmHg for carbon dioxide, and 160 mmHg for oxygen, and the bulk density of the calcined product was 2.2 g/cm³.

The obtained powder A had a peak particle diameter of 3.0 μm, a specific surface area of 3.9 m²/g, a compressed density of 3.23 g/cm³, a σs of 55.2 emu/g, and an Hc of 1540 Oe.

The average particle diameter was measured by air permeability method using SS-100, a product of Shimadzu Corporation, and was found to be 1.29 μm.

SEM observation showed that a large number of fine particles equal to or smaller than sub-micron size were found. Therefore, the ratio of plate-like particles was computed after these fine particles equal to or smaller than sub-micron size were removed. The result showed that the ratio of plate-like particles was 72%, and a large number of plate-like particles were found to be present.

The obtained ferrite powder had a peak particle diameter of 1.6 μm (a shoulder was found in a particle size distribution curve on the coarse side), a specific surface area of 2.3 $m^2/g$, a compressed density of 3.30 $g/cm^3$, a σs of 56.6 emu/g, an Hc of 3830 Oe, and a p-iHc of 2780 Oe.

Although a sufficient p-iHc was ensured, the filling properties were poor because a large number of plate-like particles were present, so that a sufficient compressed density could not be ensured.

COMPARATIVE EXAMPLE 4

A ferrite powder according to Comparative Example 4 was obtained by repeating the same procedure as in Example 1 except that the calcination temperature in the production of the powder A in Example 1 was changed to 1010° C.

The partial pressures of the respective gas components during calcining were computed to be 20 mmHg for potassium chloride, 641 mmHg for carbon dioxide, and 21 mmHg for oxygen, and the bulk density of the calcined product was 1.5 $g/cm^3$.

The obtained powder A had a peak particle diameter of 1.6 μm, a specific surface area of 4.8 $m^2/g$, a σs of 56.5 emu/g, and an Hc of 3240 Oe.

SEM observation results showed that a large number of aggregates composed of particles having a sub-micron primary particle size were found. Since a considerable number of particles were aggregated, the minor-axis diameters were difficult to measure, so that the ratio of plate-like particles could not be computed.

The obtained ferrite powder had a peak particle diameter of 1.8 μm (only a single peak), a specific surface area of 2.7 $m^2/g$, a compressed density of 3.24 $g/cm^3$, a σs of 56.8 emu/g, an Hc of 4220 Oe, and a p-iHc of 3120 Oe. Although a sufficient p-iHc was ensured, the specific surface area was found to be high, and a sufficient compressed density was not ensured.

COMPARATIVE EXAMPLE 5

A ferrite powder according to Comparative Example 5 was obtained by repeating the same procedure as in Example 1 except that the mixing ratio of the powder A to the powder B in Example 1 was changed to 55 parts by weight: 45 parts by weight.

The obtained ferrite powder had peak particle diameters of 1.2 μm and 5.6 μm, a specific surface area of 2.0 $m^2/g$, a compressed density of 3.48 $g/cm^3$, a σs of 55.9 emu/g, an Hc of 3770 Oe, and a p-iHc of 2650 Oe.

A sufficient p-iHc was ensured. However, since the volume of the powder B was larger than the volume of the spaces between the particles of the powder A, the powder B spilled over the spaces between the particles. This may be the reason that a sufficient compressed density could not be ensured.

COMPARATIVE EXAMPLE 6

A ferrite powder according to Comparative Example 6 was obtained by repeating the same procedure as in Example 1 except that the annealing temperature in Example 1 was changed to 750° C. The obtained ferrite powder had peak particle diameters of 1.2 μm and 5.3 μm, a specific surface area of 2.1 $m^2/g$, a compressed density of 3.56 $g/cm^3$, a σs of 55.4 emu/g, an Hc of 2760 Oe, and a p-iHc of 2030 Oe. Although a sufficient compressed density was ensured, the p-iHc was insufficient. This may be because annealing was not enough to remove the strain in the crystals.

EXAMPLE 12

0.8 Parts by weight of a silane-based coupling agent (Z-6094N, product of Dow Corning Toray Co., Ltd.) was added to 91.7 parts by weight of the ferrite powder obtained in Example 1, and the mixture was mixed using a mixer (type SK-10, product of Kyoritsu Riko K. K.) to subject the ferrite powder to surface treatment. Next, 6.7 parts by weight of 6-nylon in a powder form (P-1011F, product of Ube Industries, Ltd.) and 0.8 parts by weight of a lubricant (VPN—212P, product of Henkel) were added to the ferrite powder to obtain a mixture.

Next, the mixture was kneaded at 230° C. using a kneader (type 100C100, product of Toyo Seiki Seisaku-sho, Ltd.) and then pulverized using a plastic pulverizer to obtain pellets having an average diameter of 2 mm.

The melt flow rate of the kneaded pellets was measured and found to be 106 g/10 min.

The kneaded pellets were injection-molded at 290° C. and a molding pressure of 85 $kgf/cm^2$ in a magnetic field of 4.3 kOe to obtain a cylindrical anisotropic bonded magnet according to Example 12 that had a diameter of 15 mm and a height of 8 mm.

The bonded magnet according to Example 12 was measured using a BH tracer. It was found that the Br was 3100 G, the iHc was 2260 Oe, and the BHmax was 2.28 MGOe.

Since sufficient flowability (MFR) and iHc were ensured, a bonded magnet having a high BHmax could be obtained even when a low magnetic field of 4.3 kOe was used for orientation.

Kneaded pellets containing 93 parts by weight of the ferrite powder in Example 1 were obtained by the same procedure as above except that the mixing weight ratio was changed to 92.8 parts by weight of the ferrite powder, 0.7 parts by weight of the silane-based coupling agent, 5.7 parts by weight of the 6-nylon in a powder form, and 0.8 parts by weight of the lubricant.

The melt flow rate of the obtained kneaded pellets was 39 g/10 min. It was found that the ferrite powder obtained in Example 1 exhibited relatively high flowability even when the amount of the ferrite in the compound (kneaded pellets) was high.

EXAMPLE 13

Kneaded pellets containing a ferrite powder in an amount of 92 parts by weight, a bonded magnet, and kneaded pellets containing a ferrite powder in an amount of 93 parts by weight were obtained by repeating the same procedure as in Example 12 except that the ferrite powder obtained in Example 2 was used.

The melt flow rates of the kneaded pellets were 110 g/10 min (92 parts by weight) and 46 g/10 min (93 parts by weight).

As for the magnetic properties of the bonded magnet, the Br was 3080 G, the iHc was 2140 Oe, and the BHmax was 2.24 MGOe.

Since sufficient flowability (MFR) and iHc were ensured, a bonded magnet having a high BHmax could be obtained even when a low magnetic field of 4.3 kOe was used for orientation.

EXAMPLE 14

Kneaded pellets containing a ferrite powder in an amount of 92 parts by weight and a bonded magnet were obtained by repeating the same procedure as in Example 12 except that the ferrite powder obtained in Example 8 was used.

The melt flow rate of the kneaded pellets was 130 g/10 min. As for the magnetic properties of the bonded magnet, the Br was 3040 G, the iHc was 2460 Oe, and the BHmax was 2.22 MGOe.

Since sufficient flowability (MFR) and iHc were ensured, a bonded magnet having a high BHmax could be obtained even when a low magnetic field of 4.3 kOe was used for orientation.

EXAMPLE 15

Kneaded pellets containing a ferrite powder in an amount of 92 parts by weight and a bonded magnet were obtained by repeating the same procedure as in Example 12 except that the ferrite powder obtained in Example 10 was used.

The melt flow rates of the kneaded pellets were 161 g/10 min. As for the magnetic properties of the bonded magnet, the Br was 3180 G, the iHc was 2620 Oe, and the BHmax was 2.46 MGOe.

Since sufficient flowability (MFR) and sufficient iHc were ensured, a bonded magnet having a high BHmax could be obtained even when a low magnetic field of 4.3 kOe was used for orientation.

EXAMPLE 16

Kneaded pellets containing a ferrite powder in an amount of 92 parts by weight and a bonded magnet were obtained by repeating the same procedure as in Example 12 except that the ferrite powder obtained in Example 11 was used.

The melt flow rate of the kneaded pellets was 158 g/10 min. As for the magnetic properties of the bonded magnet, the Br was 3180 G, the iHc was 2600 Oe, and the BHmax was 2.47 MGOe.

Since sufficient flowability (MFR) and sufficient iHc were ensured, a bonded magnet having a high BHmax could be obtained even when a low magnetic field of 4.3 kOe was used for orientation.

COMPARATIVE EXAMPLE 7

Kneaded pellets containing a ferrite powder in an amount of 92 parts by weight were obtained by repeating the same procedure as in Example 12 except that the ferrite powder obtained in Comparative Example 1 was used.

The melt flow rate of the kneaded pellets was 18 g/10 min. Since the flowability was insufficient, a bonded magnet could not be molded.

COMPARATIVE EXAMPLE 8

Kneaded pellets containing a ferrite powder in an amount of 92 parts by weight were obtained by repeating the same procedure as in Example 12 except that the ferrite powder obtained in Comparative Example 2 was used.

The melt flow rate of the kneaded pellets was 56 g/10 min. As for the magnetic properties of the bonded magnet, the Br was 2760 G, the iHc was 2320 Oe, and the BHmax was 1.90 MGOe.

Since the compressed density of the ferrite powder was low and the flowability (MFR) was also insufficient, the residual magnetic flux is density was low when a low magnetic field of 4.3 kOe was used for orientation. Therefore, the desired BHmax could not be obtained.

COMPARATIVE EXAMPLE 9

Kneaded pellets containing a ferrite powder in an amount of 92 parts by weight were obtained by repeating the same procedure as in Example 12 except that the ferrite powder obtained in Comparative Example 3 was used.

The melt flow rate of the kneaded pellets was 8 g/10 min. Since the flowability was insufficient, a bonded magnet could not be molded.

COMPARATIVE EXAMPLE 10

The same procedure as in Example 12 was repeated except that the ferrite powder obtained in Comparative Example 4 was used. When the amount of ferrite was 92 parts by weight, the flowability during kneading was insufficient, so that kneaded pellets could not be obtained.

COMPARATIVE EXAMPLE 11

Kneaded pellets containing a ferrite powder in an amount of 92 parts by weight and a bonded magnet were obtained by repeating the same procedure as in Example 12 except that the ferrite powder obtained in Comparative Example 5 was used.

The melt flow rate of the kneaded pellets was 71 g/10 min. As for the magnetic properties of the bonded magnet, the Br was 2810 G, the iHc was 2350 Oe, and the BHmax was 1.93 MGOe.

Although a sufficient iHc was ensured, the compressed density of the ferrite powder was low, and the flowability (MFR) was also insufficient. Therefore, the residual magnetic flux density was low when a low magnetic field of 4.3 kOe was used for orientation, so that the desired BHmax could not be obtained.

COMPARATIVE EXAMPLE 12)

Kneaded pellets containing a ferrite powder in an amount of 92 parts by weight and a bonded magnet were obtained by repeating the same procedure as in Example 12 except that the ferrite powder obtained in Comparative Example 6 was used.

The melt flow rate of the kneaded pellets was 76 g/10 min. As for the magnetic properties of the bonded magnet, the Br was 2740 G, the iHc was 1990 Oe, and the BHmax was 1.85 MGOe.

Although the residual magnetic flux density was relatively high, the Hc was insufficient. Therefore, the desired BHmax could not be obtained when a low magnetic field of 4.3 kOe was used for orientation.

EXAMPLE 17

A powder A according to Example 17 was obtained by repeating the same procedure as in Example 2 except that the wet pulverization in the production of the powder A in Example 2 was performed using a wet mill (WM).

The obtained powder A had a peak particle diameter of 6.2 µm, a specific surface area of 0.7 $m^2/g$, a σs of 56.4 emu/g, and an Hc of 1,200 Oe, and the ratio of plate-like particles was 22%.

A powder B according to Example 17 was obtained by repeating the same procedure as in Example 1 except that the wet pulverization in the production of the powder B in Example 1 was performed using a wet mill (WM).

The obtained powder B had a peak particle diameter of 1.1 µm, a specific surface area of 7.0 $m^2/g$, a σs of 54.6 emu/g, and an Hc of 2520 Oe.

A ferrite powder according to Example 17 was obtained by repeating the same procedure as in Example 1 except that the unannealed powder mixture was processed using a vibratory ball mill (Uras Vibrator KEC-8-YH, product of MURAKAMI SEIKI MFG., Co., Ltd.) and was then annealed.

The obtained ferrite powder had peak particle diameters of 1.2 μm and 3.8 μm, a specific surface area of 1.7 m$^2$/g, a compressed density of 3.64 g/cm$^3$, a σs of 56.4 emu/g, an Hc of 3170 Oe, and a p-iHc of 2300 Oe. The specific surface area was found to be low, and a sufficient compressed density and a sufficient p-iHc were found to be ensured.

EXAMPLE 18

A powder A according to Example 18 was obtained by repeating the same procedure as in Example 2 except that the amount of potassium chloride added in the production of the powder A in Example 2 was changed to 2.80 wt % and that the wet pulverization was performed using a wet mill (WM).

The obtained powder A had a peak particle diameter of 6.0 μm, a specific surface area of 0.7 m$^2$/g, a σs of 56.5 emu/g, and an Hc of 1230 Oe, and the ratio of plate-like particles was 19%.

A powder B according to Example 18 was obtained by repeating the same procedure as in Example 1 except that the calcination temperature in the production of the powder B in Example 1 was changed to 1,020° C. and that the wet pulverization was performed using a wet mill (WM).

The obtained powder B had a peak particle diameter of 1.0 μm, a specific surface area of 7.5 m$^2$/g, a σs of 54.2 emu/g, and an Hc of 2670 Oe.

A ferrite powder in Example 18 was obtained by repeating the same procedure as in Example 1 except that the unannealed powder mixture was processed using a vibratory ball mill (Uras Vibrator KEC-8-YH, product of MURAKAMI SEIKI MFG., Co., Ltd.) and was then annealed.

The obtained ferrite powder had peak particle diameters of 1.2 μm and 4.3 μm, a specific surface area of 1.7 m$^2$/g, a compressed density of 3.64 g/cm$^3$, a σs of 56.3 emu/g, an Hc of 3280 Oe, and a p-iHc of 2380 Oe. The specific surface area was found to be low, and a sufficient compressed density and a sufficient p-iHc were found to be ensured.

EXAMPLE 19

A powder A according to Example 19 was obtained by repeating the same procedure as in Example 1 except that the potassium chloride in the production of the powder A in Example 1 was changed to magnesium chloride and 2.25 wt % of magnesium chloride was added. The obtained powder A had a peak particle diameter of 5.1 μm, a specific surface area of 0.8 m$^2$/g, a σs of 56.1 emu/g, and an Hc of 1530 Oe, and the ratio of plate-like particles was 25%.

A ferrite powder according to Example 19 was obtained by repeating the same procedure as in Example 1 except that the above-obtained powder A and the powder B obtained in Example 1 were mixed in the same ratio as that in Example 1 and that the unannealed powder mixture was processed using a vibratory ball mill (Uras Vibrator KEC-8-YH, product of MURAKAMI SEIKI MFG., Co., Ltd.) and was then annealed at a temperature of 940° C.

The obtained ferrite powder had peak particle diameters of 1.3 μm and 3.2 μm, a specific surface area of 1.8 m$^2$/g, a compressed density of 3.60 g/cm$^3$, a σs of 55.7 emu/g, an Hc of 3490 Oe, and a p-iHc of 2550 Oe. The specific surface area was found to be low, and a sufficient compressed density and a sufficient p-iHc were found to be ensured.

EXAMPLE 20

(1) Production of Coarsely Pulverized Raw Powder for Powder A

Iron oxide and strontium carbonate were weighed in a molar ratio of iron oxide 5.9: strontium carbonate 1.

0.18 Percent by weight of boric acid and 2.44 percent by weight of potassium chloride were added to the weighed materials and then mixed. The mixture was granulated with water into a spherical shape with a diameter of 3 to 10 mm, and the granulated product was dried in air at 150° C.

200 g of the granulated product was placed in an alumina-made container having a volume of 0.68 L (in an air atmosphere). After the container was covered with an alumina-made lid, calcining was performed in an electric furnace at 1260° C. for 80 minutes to obtain a calcined product.

The bulk density of the calcined product was 1.6 g/cm$^3$, and it was found that almost no calcining of the particles proceeded.

The calcined product was processed using a hammer mill (Eck sample mill type KII, product of Fuji Paudal co., Ltd.) to obtain a coarsely pulverized raw powder for a powder A.

(2) Production of Raw Material for Powder B

Iron oxide and strontium carbonate were weighed in a molar ratio of iron oxide 5.5: strontium carbonate 1 and were then mixed together. Then the mixture was granulated with water into a spherical shape with a diameter of 3 to 10 mm, and the granulated product was dried in air at 150° C.

200 g of the granulated product was placed in an alumina-made container having a volume of 0.68 L (in an air atmosphere). After the container was covered with an alumina-made lid, calcining was performed in an electric furnace at 1020° C. for 80 minutes to obtain a calcined product.

The calcined product was processed by a hammer mill (Eck sample mill type KII, product of Fuji Paudal co., Ltd.) to obtain a coarsely pulverized raw powder for a powder B.

(3) Production of Powder Mixture (Ferrite Powder)

The coarsely pulverized raw powder for the powder A (70 parts by weight) obtained in the above (1), the coarsely pulverized raw powder for the powder B (30 parts by weight) obtained in the above (2), and tap water (150 parts by weight) were weighed. Then all the powders were dispersed using a wet mill (WM). The slurry was filtrated, and the obtained cake was dried in air at 150° C. for 10 hours. The dried cake was pulverized by a mixer (product name: sample mil SK-M10, product of Kyoritsu Riko K. K.). The obtained powder mixture was processed using a vibratory ball mill (Uras Vibrator KEC-8-YH, product of MURAKAMI SEIKI MFG., Co., Ltd.) and then was annealed to obtain a ferrite powder according to Example 20.

The obtained ferrite powder had peak particle diameters of 1.4 μm and 3.8 μm, a specific surface area of 1.7 m$^2$/g, a compressed density of 3.62 g/cm$^3$, a σs of 56.4 emu/g, an Hc of 3110 Oe, and a p-iHc of 2290 Oe. The specific surface area was found to be low, and a sufficient compressed density and a sufficient p-iHc were found to be ensured.

EXAMPLE 21

A ferrite powder according to Example 21 was obtained by repeating the same procedure as in Example 1 except that the unannealed powder mixture was changed to a powder mixture of the powder A obtained in Example 2 and the powder B obtained in Example 1 in a mixing ratio (coarse/fine) of 65 parts by weight (powder A)/35 parts by weight (powder B) and that the powder mixture was processed using a vibratory ball mill (Uras Vibrator KEC-8-YH, product of MURAKAMI SEIKI MFG., Co., Ltd.) and was then annealed.

The obtained ferrite powder had peak particle diameters of 1.3 μm and 3.8 μm, a specific surface area of 1.8 m$^2$/g, a compressed density of 3.59 g/cm$^3$, a σs of 56.1 emu/g, an Hc of 3410 Oe, and a p-iHc of 2390 Oe. The specific surface area was found to be low, and a sufficient compressed density and a sufficient p-iHc were found to be ensured.

EXAMPLE 22

A ferrite powder according to Example 22 was obtained by repeating the same procedure as in Example 1 except that the mixing ratio (coarse/fine) in the unannealed powder mixture was changed to 75 parts by weight (powder A)/25 parts by weight (powder B) and the obtained powder mixture was processed using a vibratory ball mill (Uras Vibrator KEC-8-YH, product of MURAKAMI SEIKI MFG., Co., Ltd.) and was then annealed.

The obtained ferrite powder had peak particle diameters of 1.3 μm and 4.0 μm, a specific surface area of 1.7 m$^2$/g, a compressed density of 3.61 g/cm$^3$, a σs of 56.4 emu/g, an Hc of 3100 Oe, and a p-iHc of 2260 Oe. The specific surface area was found to be low, and a sufficient compressed density and a sufficient p-iHc were found to be ensured.

EXAMPLE 23

Kneaded pellets containing a ferrite powder in an amount of 92 parts by weight and a bonded magnet were obtained by repeating the same procedure as in Example 12 except that the ferrite powder obtained in Example 17 was used.

The melt flow rate of the kneaded pellets was 161 g/10 min. As for the magnetic properties of the bonded magnet, the Br was 3240 G, the iHc was 2170 Oe, and the BHmax was 2.57 MGOe.

Since sufficient flowability (MFR) and iHc were ensured, a bonded magnet having a high BHmax could be obtained even when a low magnetic field of 4.3 kOe was used for orientation.

EXAMPLE 24

Kneaded pellets containing a ferrite powder in an amount of 92 parts by weight and a bonded magnet were obtained by repeating the same procedure as in Example 12 except that the ferrite powder obtained in Example 18 was used.

The melt flow rate of the kneaded pellets was 217 g/10 min. As for the magnetic properties of the bonded magnet, the Br was 3270 G, the iHc was 2240 Oe, and the BHmax was 2.61 MGOe.

Since sufficient flowability (MFR) and iHc were ensured, a bonded magnet having a high BHmax could be obtained even when a low magnetic field of 4.3 kOe was used for orientation.

EXAMPLE 25

Kneaded pellets containing a ferrite powder in an amount of 92 parts by weight and a bonded magnet were obtained by repeating the same procedure as in Example 12 except that the ferrite powder obtained in Example 19 was used.

The melt flow rate of the kneaded pellets was 139 g/10 min. As for the magnetic properties of the bonded magnet, the Br was 3150 G, the iHc was 2470 Oe, and the BHmax was 2.42 MGOe.

Since sufficient flowability (MFR) and iHc were ensured, a bonded magnet having a high BHmax could be obtained even when a low magnetic field of 4.3 kOe was used for orientation.

EXAMPLE 26

Kneaded pellets containing a ferrite powder in an amount of 92 parts by weight and a bonded magnet were obtained by repeating the same procedure as in Example 12 except that the ferrite powder obtained in Example 20 was used.

The melt flow rate of the kneaded pellets was 115 g/10 min. As for the magnetic properties of the bonded magnet, the Br was 3200 G, the iHc was 2190 Oe, and the BHmax was 2.52 MGOe.

Since sufficient flowability (MFR) and iHc were ensured, a bonded magnet having a high BHmax could be obtained even when a low magnetic field of 4.3 kOe was used for orientation.

EXAMPLE 27

Kneaded pellets containing a ferrite powder in an amount of 92 parts by weight and a bonded magnet were obtained by repeating the same procedure as in Example 12 except that the ferrite powder obtained in Example 21 was used.

The melt flow rate of the kneaded pellets was 115 g/10 min. As for the magnetic properties of the bonded magnet, the Br was 3170 G, the iHc was 2350 Oe, and the BHmax was 2.45 MGOe.

Since sufficient flowability (MFR) and iHc were ensured, a bonded magnet having a high BHmax could be obtained even when a low magnetic field of 4.3 kOe was used for orientation.

EXAMPLE 28

Kneaded pellets containing a ferrite powder in an amount of 92 parts by weight and a bonded magnet were obtained by repeating the same procedure as in Example 12 except that the ferrite powder obtained in Example 22 was used.

The melt flow rate of the kneaded pellets was 137 g/10 min. As for the magnetic properties of the bonded magnet, the Br was 3260 G, the iHc was 2150 Oe, and the BHmax was 2.60 MGOe.

Since sufficient flowability (MFR) and iHc were ensured, a bonded magnet having a high BHmax could be obtained even when a low magnetic field of 4.3 kOe was used for orientation.

The production conditions and various properties of the ferrite powders A are shown in Table 2. The production conditions and various properties of the ferrite powders B are shown in Table 3. The various properties before and after a ferrite powder A and a fine powder are mixed and annealed are shown in Table 4. Various properties of bonded magnets are shown in Table 5.

The properties of the ferrite particles after annealing shown in Table 4 are also shown in Table 5.

The abbreviations of devices (such as UBM, SG, PM, and WM) in Table 3 are similar to those in Table 2.

Referring to Table 5, the bonded magnets produced using the ferrite powders of the present invention have energy product equal to or larger than 2.0 MGOe. However, the bonded magnets produced using the ferrite powders in the Comparative Examples have energy product less than 2.0 MGOe.

As can be seen by comparing the values of Br and the values of Hc, the coercive force is not significantly different between the Examples and Comparative Examples.

However, as for Br, the magnetization in the Examples is 3000 G or more, but the magnetization in the Comparative Examples is at most 2810 G.

More specifically, the difference between the Examples and Comparative Examples is the difference in magnetization of the formed magnets.

The reasons of the difference in magnetization of the formed magnets are the ease of increasing the density of a powder and the ease of orienting a magnetic powder during molding in a magnetic field.

Therefore, first, the MFRs in the Examples and Comparative Examples are compared. In all the Examples, the melt flow rate was 100 g/min or more. However, in the Comparative Examples, the melt flow rate was always less than 80 g/min.

Next, the compressed densities (CD) of the ferrite particles before a binder is added thereto are compared. In all the Examples, the compressed density was 3.5 g/cm³ or more. However, the compressed density was less than 3.5 in all the Comparative Examples except for Comparative Example 12 (the ferrite powder in Comparative Example 6).

In Comparative Example 6, the compressed density was 3.56 g/cm³ which was greater than 3.5 g/cm³. However, in Comparative Example 6, the temperature in the annealing step was 750° C. and was lower than 970° C. used in the Examples. Therefore, the intrinsic coercive force of compression moulding after annealing was as low as 2030 Oe.

In the Examples, the intrinsic coercive force of compression moulding was 2100 Oe or more.

This indicates that the annealing temperature affects the crystallinity and must be about 970° C.

In other words, when the coercive force of a green compact is equal to or larger than 2100 Oe, it can be judged that annealing at 970° C. has been performed.

Next, the SSAs are compared. In the Examples, the SSA was 2.0 m²/g or less. However, in the Comparative Examples, the SSA tended to be greater than those in the Examples.

However, the peak values in the particle size distributions were not significantly different between the Examples and Comparative Examples.

This may be because the degree of particle growth is higher in the Examples and smooth crystals are generated. Therefore, even when the particle diameters are the same, the number of active sites on the surface is smaller in the Examples, and the particles are easily oriented without entanglement with the binder.

Accordingly, when a ferrite powder (the intrinsic coercive force of compression moulding is 2100 Oe or more) annealed at 970° C. and having a compressed density (CD) of 3.5 g/cm³ and a specific surface area (SSA) of 2.0 m²/g or less is used for a bonded magnet, the coercive force is not reduced, and a high degree of orientation is obtained because the MFR is high. Therefore, a high energy product can be obtained.

Referring to Table 2, one reason that the ferrite powders in the Examples can be produced is that the mixture of the initial raw materials that are iron oxide and strontium carbonate is calcined at 1200° C. or higher in an environment containing a chloride such as NaCl or KCl at its saturated vapor pressure.

In Comparative Examples 1 to 3, although KCl was present, the container was not covered with a lid, and therefore the sample was not calcined at the saturated vapor pressure.

In Comparative Example 4, it can be assumed that the saturated vapor pressure of KCl was obtained in the container with a lid. However, since the calcination temperature was as low as 1010° C., the specific surface area (SSA) was 4.8 m²/g and larger than that of any of other samples, so that the crystal growth in the powder was poor.

Therefore, a ferrite powder that could be easily packed and oriented and is prevented from a reduction in coercive force could be produced by mixing a ferrite powder calcined at a temperature from 1050° C. to 1300° C. in the presence of the chloride of Na or K at its saturated vapor pressure with a fine ferrite powder and calcining the mixture.

TABLE 2

FERRITE POWDER A (LOW SPECIFIC SURFACE AREA: COARSE PARTICLES)

| | RAW MATERIAL COMPOSITION | | | | CALCINATION | | | | | |
|---|---|---|---|---|---|---|---|---|---|---|
| | Fe2O3/SrO MOLAR RATIO | BORIC ACID [wt %] | TYPE OF CHLORIDE | [wt %] | TEMPERA- TURE | ATMO- SPHERE | PARTIAL PRESSURE (mmHg) TYPE OF CHLORIDE | CHLORIDE | CO2 | O2 |
| EXAMPLE 1 | 5.9 | 0.18 | KCl | 2.44 | 1245° C. | WITH LID | KCl | 210 | 476 | 15 |
| EXAMPLE 2 | 5.9 | 0.18 | KCl | 2.44 | 1260° C. | WITH LID | KCl | 250 | 442 | 14 |
| EXAMPLE 3 | 5.9 | 0.18 | KCl | 2.44 | 1230° C. | WITH LID | KCl | 190 | 494 | 16 |
| EXAMPLE 4 | 5.9 | 0.18 | NaCl | 2.44 | 1245° C. | WITH LID | NaCl | 80 | 589 | 19 |
| EXAMPLE 5 | 5.9 | 0.18 | NaCl | 2.44 | 1260° C. | WITH LID | NaCl | 150 | 528 | 17 |
| EXAMPLE 6 | 5.9 | 0.18 | NONE | — | TUBULAR FURNACE 1260° C. | NO FLOW (+KCl) | KCl | 250 | 222 | 60 |
| EXAMPLE 7 | 5.9 | 0.18 | NONE | — | TUBULAR FURNACE 1260° C. | Air FLOW (+KCl) | KCl | 250 | 0 | 110 |
| EXAMPLE 8 | 5.9 | 0.18 | KCl | 2.44 | 1245° C. | WITH LID | KCl | 210 | 476 | 15 |
| EXAMPLE 9 | 5.9 | 0.18 | KCl | 2.44 | 1245° C. | WITH LID | KCl | 210 | 476 | 15 |
| EXAMPLE 10 | 5.9 | 0.18 | KCl | 2.44 | 1245° C. | WITH LID | KCl | 210 | 476 | 15 |
| EXAMPLE 11 | 5.9 | 0.18 | KCl | 2.44 | 1245° C. | WITH LID | KCl | 210 | 476 | 15 |
| EXAMPLE 17 | 5.9 | 0.18 | KCl | 2.44 | 1260° C. | WITH LID | KCl | 250 | 442 | 14 |
| EXAMPLE 18 | 5.9 | 0.18 | KCl | 2.80 | 1260° C. | WITH LID | KCl | 250 | 442 | 14 |
| EXAMPLE 19 | 5.8 | 0.18 | MgCl2 | 2.25 | 1245° C. | WITH LID | MgCl2 | 250 | 442 | 14 |
| EXAMPLE 20 | 5.9 | 0.18 | KCl | 2.44 | 1260° C. | WITH LID | KCl | 250 | 442 | 14 |

TABLE 2-continued

| | | | | | | | | | | |
|---|---|---|---|---|---|---|---|---|---|---|
| EXAMPLE 21 | 5.9 | 0.18 | KCl | 2.44 | 1260° C. | WITH LID | KCl | 250 | 442 | 14 |
| EXAMPLE 22 | 5.9 | 0.18 | KCl | 2.44 | 1245° C. | WITH LID | KCl | 210 | 476 | 15 |
| COMPARATIVE EXAMPLE 1 | 5.9 | 0.18 | KCl | 2.44 | 1245° C. | WITHOUT LID | KCl | 0 | 0 | 160 |
| COMPARATIVE EXAMPLE 2 | 5.9 | 0.18 | KCl | 2.44 | 1245° C. | WITHOUT LID | KCl | 0 | 0 | 160 |
| COMPARATIVE EXAMPLE 3 | 5.9 | NaBO2 2.1 | KCl | 2.1 | 1200° C. | WITHOUT LID | KCl | 0 | 0 | 160 |
| COMPARATIVE EXAMPLE 4 | 5.9 | 0.18 | KCl | 2.44 | 1010° C. | WITH LID | KCl | 20 | 641 | 21 |
| COMPARATIVE EXAMPLE 5 | 5.9 | 0.18 | KCl | 2.44 | 1245° C. | WITH LID | KCl | 210 | 476 | 15 |
| COMPARATIVE EXAMPLE 6 | 5.9 | 0.18 | KCl | 2.44 | 1245° C. | WITH LID | KCl | 210 | 476 | 15 |

| | FERRITE POWDER A (LOW SPECIFIC SURFACE AREA: COARSE PARTICLES) | | | | | |
|---|---|---|---|---|---|---|
| | | Helos | | VSM (NON-ORIENTED) | | RATIO OF |
| | APPARATUS<sup>✕</sup> | PEAK μm | SSA [m2/g] | σs [emu/g] | Hc [Oe] | PLATE-LIKE PARTICLES |
| EXAMPLE 1 | UBM | 5.3 | 0.7 | 56.5 | 1490 | 25% |
| EXAMPLE 2 | UBM | 6.7 | 0.6 | 56.5 | 1210 | 24% |
| EXAMPLE 3 | UBM | 5.2 | 0.9 | 56.5 | 1590 | 19% |
| EXAMPLE 4 | UBM | 5.1 | 1.1 | 56.4 | 1510 | 21% |
| EXAMPLE 5 | UBM | 6.3 | 0.8 | 56.5 | 1330 | 28% |
| EXAMPLE 6 | UBM | 6.8 | 0.7 | 56.6 | 1410 | 16% |
| EXAMPLE 7 | UBM | 6.8 | 0.7 | 56.4 | 1420 | 18% |
| EXAMPLE 8 | SG | 5.0 | 0.8 | 55.6 | 1760 | 11% |
| EXAMPLE 9 | PM | 5.3 | 0.9 | 55.9 | 1720 | 23% |
| EXAMPLE 10 | UBM | 5.3 | 0.7 | 56.5 | 1490 | 25% |
| EXAMPLE 11 | SG | 5.0 | 0.8 | 55.6 | 1760 | 11% |
| EXAMPLE 17 | WM | 6.2 | 0.7 | 56.4 | 1200 | 22% |
| EXAMPLE 18 | WM | 6.0 | 0.7 | 56.5 | 1230 | 19% |
| EXAMPLE 19 | UBM | 5.1 | 0.8 | 56.1 | 1530 | 25% |
| EXAMPLE 20 | WM SYNTHESIS | — | — | — | — | — |
| EXAMPLE 21 | UBM | 6.7 | 0.6 | 56.5 | 1210 | 24% |
| EXAMPLE 22 | UBM | 5.3 | 0.7 | 56.5 | 1490 | 25% |
| COMPARATIVE EXAMPLE 1 | UBM | 10.6 | 0.9 | 54.8 | 1520 | NOT COMPUTABLE |
| COMPARATIVE EXAMPLE 2 | WM | 4.8 | 1.9 | 55.1 | 1220 | 67% |
| COMPARATIVE EXAMPLE 3 | WM | 3.0 | 3.9 | 55.2 | 1540 | 72% |
| COMPARATIVE EXAMPLE 4 | UBM | 1.6 | 4.8 | 56.5 | 3240 | NOT COMPUTABLE |
| COMPARATIVE EXAMPLE 5 | UBM | 5.3 | 0.7 | 56.5 | 1490 | 25% |
| COMPARATIVE EXAMPLE 6 | UBM | 5.3 | 0.7 | 56.5 | 1490 | 25% |

<sup>✕</sup>UBM: PLANETARY BALL MILL; SG: SAND GRINDER; PM: PEARL MILL; WM: WET MILL; WM SYNTHESIS: PARTICLE SYNTHESIS WITH WET MILL

TABLE 3

| | FERRITE POWDER B | | | | | | |
|---|---|---|---|---|---|---|---|
| | | | | Helos | | VMS (NON-ORIENTED) | |
| | Fe2O3/SrO MOLAR RATIO | CALCINATION TEMPERATURE | APPARATUS* | PEAK μm | SSA [m2/g] | σs [emu/g] | Hc [Oe] |
| EXAMPLE 1 | 5.5 | 1070° C. | UBM | 1.1 | 6.8 | 54.4 | 2570 |
| EXAMPLE 2 | 5.5 | 1070° C. | UBM | 1.1 | 6.8 | 54.4 | 2570 |
| EXAMPLE 3 | 5.5 | 1070° C. | UBM | 1.1 | 6.8 | 54.4 | 2570 |
| EXAMPLE 4 | 5.5 | 1070° C. | UBM | 1.1 | 6.8 | 54.4 | 2570 |
| EXAMPLE 5 | 5.5 | 1070° C. | UBM | 1.1 | 6.8 | 54.4 | 2570 |
| EXAMPLE 6 | 5.5 | 1070° C. | UBM | 1.1 | 6.8 | 54.4 | 2570 |
| EXAMPLE 7 | 5.5 | 1070° C. | UBM | 1.1 | 6.8 | 54.4 | 2570 |
| EXAMPLE 8 | 5.5 | 1070° C. | UBM | 1.1 | 6.8 | 54.4 | 2570 |
| EXAMPLE 9 | 5.5 | 1070° C. | UBM | 1.1 | 6.8 | 54.4 | 2570 |
| EXAMPLE 10 | 5.5 | 1070° C. | UBM | 1.1 | 6.8 | 54.4 | 2570 |
| EXAMPLE 11 | 5.5 | 1070° C. | UBM | 1.1 | 6.8 | 54.4 | 2570 |
| EXAMPLE 17 | 5.5 | 1070° C. | WM | 1.1 | 7.0 | 54.6 | 2520 |
| EXAMPLE 18 | 5.5 | 1020° C. | WM | 1.0 | 7.5 | 54.2 | 2670 |
| EXAMPLE 19 | 5.5 | 1070° C. | UBM | 1.1 | 6.8 | 54.4 | 2570 |
| EXAMPLE 20 | 5.5 | 1020° C. | WM SYNTHESIS | — | — | — | — |

TABLE 3-continued

| | FERRITE POWDER B | | | | | | |
|---|---|---|---|---|---|---|---|
| | | | | Helos | | VMS (NON-ORIENTED) | |
| | Fe2O3/SrO MOLAR RATIO | CALCINATION TEMPERATURE | APPARATUS* | PEAK μm | SSA [m2/g] | σs [emu/g] | Hc [Oe] |
| EXAMPLE 21 | 5.5 | 1070° C. | UBM | 1.1 | 6.8 | 54.4 | 2570 |
| EXAMPLE 22 | 5.5 | 1070° C. | UBM | 1.1 | 6.8 | 54.4 | 2570 |
| COMPARATIVE EXAMPLE 1 | 5.5 | 1070° C. | UBM | 1.1 | 6.8 | 54.4 | 2570 |
| COMPARATIVE EXAMPLE 2 | 5.5 | 1070° C. | UBM | 1.1 | 6.8 | 54.4 | 2570 |
| COMPARATIVE EXAMPLE 3 | 5.5 | 1070° C. | UBM | 1.1 | 6.8 | 54.4 | 2570 |
| COMPARATIVE EXAMPLE 4 | 5.5 | 1070° C. | UBM | 1.1 | 6.8 | 54.4 | 2570 |
| COMPARATIVE EXAMPLE 5 | 5.5 | 1070° C. | UBM | 1.1 | 6.8 | 54.4 | 2570 |
| COMPARATIVE EXAMPLE 6 | 5.5 | 1070° C. | UBM | 1.1 | 6.8 | 54.4 | 2570 |

TABLE 4

| | | PROPERTIES BEFORE ANNEALING | | | | PROPERTIES AFTER ANNEALING | |
|---|---|---|---|---|---|---|---|
| | MIXING RATIO COARSE/FINE | Helos PEAK μm | PEAK μm | SSA [m2/g] | CD [g/cm3] | ANNEALING TEMPERATURE | Helos PEAK μm |
| EXAMPLE 1 | 70/30 | 1.4 | 5.5 | 2.4 | 3.59 | 970° C. | 1.2 |
| EXAMPLE 2 | 70/30 | 1.1 | 6.6 | 2.4 | 3.65 | 970° C. | 1.3 |
| EXAMPLE 3 | 70/30 | 1.2 | 5.0 | 2.3 | 3.56 | 970° C. | 1.3 |
| EXAMPLE 4 | 70/30 | 1.4 | 4.7 | 2.8 | 3.55 | 970° C. | 1.4 |
| EXAMPLE 5 | 70/30 | 1.1 | 6.0 | 2.5 | 3.56 | 970° C. | 1.2 |
| EXAMPLE 6 | 70/30 | 1.1 | 6.8 | 2.4 | 3.58 | 970° C. | 1.3 |
| EXAMPLE 7 | 70/30 | 1.1 | 6.9 | 2.5 | 3.58 | 970° C. | 1.3 |
| EXAMPLE 8 | 70/30 | 1.2 | 4.3 | 2.6 | 3.56 | 970° C. | 1.3 |
| EXAMPLE 9 | 70/30 | 1.2 | 5.2 | 2.7 | 3.55 | 970° C. | 1.2 |
| EXAMPLE 10 | 70/30 | 1.2 | 3.6 | 3.2 | 3.55 | 970° C. | 1.3 |
| EXAMPLE 11 | 70/30 | 1.2 | 3.5 | 3.2 | 3.56 | 970° C. | 1.5 |
| EXAMPLE 17 | 70/30 | 1.2 | 3.7 | 3.2 | 3.54 | 970° C. | 1.2 |
| EXAMPLE 18 | 70/30 | 1.1 | 3.6 | 3.4 | 3.55 | 970° C. | 1.2 |
| EXAMPLE 19 | 70/30 | 1.1 | 3.5 | 3.3 | 3.52 | 940° C. | 1.3 |
| EXAMPLE 20 | 70/30 | 1.1 | 3.6 | 3.4 | 3.55 | 970° C. | 1.4 |
| EXAMPLE 21 | 65/35 | 1.1 | 3.8 | 3.6 | 3.53 | 970° C. | 1.3 |
| EXAMPLE 22 | 75/25 | 1.2 | 3.8 | 3.1 | 3.55 | 970° C. | 1.3 |
| COMPARATIVE EXAMPLE 1 | 70/30 | 1.3 | 10.1 | 3.6 | 3.42 | 970° C. | 1.3 |
| COMPARATIVE EXAMPLE 2 | 70/30 | 1.2 | 4.8 | 3.5 | 3.41 | 970° C. | 1.3 |
| COMPARATIVE EXAMPLE 3 | 70/30 | 1.5 | 2.6 | 4.7 | 3.31 | 970° C. | 1.6 |
| COMPARATIVE EXAMPLE 4 | 70/30 | 1.6 | — | 5.4 | 3.15 | 970° C. | 1.8 |
| COMPARATIVE EXAMPLE 5 | 55/45 | 1.4 | 5.3 | 3.2 | 3.42 | 970° C. | 1.2 |
| COMPARATIVE EXAMPLE 6 | 70/30 | 1.4 | 5.5 | 2.4 | 3.59 | 750° C. | 1.2 |

| | PROPERTIES AFTER ANNEALING | | | | | |
|---|---|---|---|---|---|---|
| | | | | VMS (NON-ORIENTED) | | |
| | PEAK μm | SSA [m2/g] | CD [g/cm3] | σs [emu/g] | Hc [Oe] | p-iHc [Oe] |
| EXAMPLE 1 | 5.7 | 1.5 | 3.63 | 56.8 | 3430 | 2350 |
| EXAMPLE 2 | 6.8 | 1.5 | 3.69 | 56.5 | 3430 | 2230 |
| EXAMPLE 3 | 5.1 | 1.4 | 3.58 | 55.7 | 3760 | 2620 |
| EXAMPLE 4 | 5.3 | 1.3 | 3.57 | 56.2 | 3880 | 2740 |
| EXAMPLE 5 | 6.5 | 1.2 | 3.61 | 56.8 | 3150 | 2130 |
| EXAMPLE 6 | 6.8 | 1.4 | 3.62 | 56.3 | 3400 | 2230 |
| EXAMPLE 7 | 6.8 | 1.5 | 3.61 | 56.6 | 3380 | 2210 |
| EXAMPLE 8 | 4.7 | 1.5 | 3.59 | 56.0 | 3730 | 2570 |
| EXAMPLE 9 | 5.4 | 1.8 | 3.56 | 56.1 | 3580 | 2320 |
| EXAMPLE 10 | 3.4 | 1.6 | 3.62 | 57.1 | 3530 | 2600 |

TABLE 4-continued

|  | | | | | | |
|---|---|---|---|---|---|---|
| EXAMPLE 11 | 3.6 | 1.7 | 3.60 | 56.5 | 3530 | 2590 |
| EXAMPLE 17 | 3.8 | 1.7 | 3.64 | 56.4 | 3170 | 2300 |
| EXAMPLE 18 | 4.3 | 1.7 | 3.64 | 56.3 | 3280 | 2380 |
| EXAMPLE 19 | 3.2 | 1.8 | 3.60 | 55.7 | 3490 | 2550 |
| EXAMPLE 20 | 3.8 | 1.7 | 3.62 | 56.4 | 3110 | 2290 |
| EXAMPLE 21 | 3.8 | 1.8 | 3.59 | 56.1 | 3410 | 2390 |
| EXAMPLE 22 | 4.0 | 1.7 | 3.61 | 56.4 | 3100 | 2260 |
| COMPARATIVE EXAMPLE 1 | 11.0 | 2.0 | 3.42 | 55.9 | 3250 | 2460 |
| COMPARATIVE EXAMPLE 2 | 5.8 | 2.3 | 3.46 | 55.6 | 3330 | 2600 |
| COMPARATIVE EXAMPLE 3 | — | 2.3 | 3.30 | 56.6 | 3830 | 2780 |
| COMPARATIVE EXAMPLE 4 | — | 2.7 | 3.24 | 56.8 | 4220 | 3120 |
| COMPARATIVE EXAMPLE 5 | 5.6 | 2.0 | 3.48 | 55.9 | 3770 | 2650 |
| COMPARATIVE EXAMPLE 6 | 5.3 | 2.1 | 3.56 | 55.4 | 2760 | 2030 |

TABLE 5

| | | | PROPERTIES AFTER ANNEALING | | | | | | |
|---|---|---|---|---|---|---|---|---|---|
| | | | Helos | | | | VMS (NON-ORIENTED) | | p-iHc |
| | FERRITE POWDER | ANNEALING TEMPERATURE | PEAK (μm) | PEAK (μm) | SSA [m2/g] | CD [g/cm3] | σs [emu/g] | Hc [Oe] | (Ann970) [Oe] |
| EXAMPLE 12 | EXAMPLE 1 | 970° C. | 1.2 | 5.7 | 1.5 | 3.63 | 56.8 | 3430 | 2350 |
| EXAMPLE 13 | EXAMPLE 2 | 970° C. | 1.3 | 6.8 | 1.5 | 3.69 | 56.5 | 3430 | 2230 |
|  | EXAMPLE 3 | 970° C. | 1.3 | 5.1 | 1.4 | 3.58 | 55.7 | 3760 | 2620 |
|  | EXAMPLE 4 | 970° C. | 1.4 | 5.3 | 1.3 | 3.57 | 56.2 | 3880 | 2740 |
|  | EXAMPLE 5 | 970° C. | 1.2 | 6.5 | 1.2 | 3.61 | 56.8 | 3150 | 2130 |
|  | EXAMPLE 6 | 970° C. | 1.3 | 6.8 | 1.4 | 3.62 | 56.3 | 3400 | 2230 |
|  | EXAMPLE 7 | 970° C. | 1.3 | 6.8 | 1.5 | 3.61 | 56.6 | 3380 | 2210 |
| EXAMPLE 14 | EXAMPLE 8 | 970° C. | 1.3 | 4.7 | 1.5 | 3.59 | 56.0 | 3730 | 2570 |
|  | EXAMPLE 9 | 970° C. | 1.2 | 5.4 | 1.8 | 3.56 | 56.1 | 3580 | 2320 |
| EXAMPLE 15 | EXAMPLE 10 | 970° C. | 1.3 | 3.4 | 1.6 | 3.62 | 57.1 | 3530 | 2600 |
| EXAMPLE 16 | EXAMPLE 11 | 970° C. | 1.5 | 3.6 | 1.7 | 3.60 | 56.5 | 3530 | 2590 |
| EXAMPLE 23 | EXAMPLE 17 | 970° C. | 1.2 | 4.0 | 1.7 | 3.64 | 56.4 | 3170 | 2300 |
| EXAMPLE 24 | EXAMPLE 18 | 970° C. | 1.2 | 4.3 | 1.7 | 3.64 | 56.3 | 3280 | 2380 |
| EXAMPLE 25 | EXAMPLE 19 | 940° C. | 1.3 | 3.2 | 1.8 | 3.60 | 55.7 | 3490 | 2550 |
| EXAMPLE 26 | EXAMPLE 20 | 970° C. | 1.4 | 3.8 | 1.7 | 3.62 | 56.4 | 3110 | 2290 |
| EXAMPLE 27 | EXAMPLE 21 | 970° C. | 1.3 | 3.8 | 1.8 | 3.59 | 56.1 | 3410 | 2390 |
| EXAMPLE 28 | EXAMPLE 22 | 970° C. | 1.3 | 4.0 | 1.7 | 3.61 | 56.4 | 3100 | 2260 |
| COMPARATIVE EXAMPLE 7 | COMPARATIVE EXAMPLE 1 | 970° C. | 1.3 | 11.0 | 2.0 | 3.42 | 55.9 | 3250 | 2460 |
| COMPARATIVE EXAMPLE 8 | COMPARATIVE EXAMPLE 2 | 970° C. | 1.3 | 5.8 | 2.3 | 3.46 | 55.6 | 3330 | 2600 |
| COMPARATIVE EXAMPLE 9 | COMPARATIVE EXAMPLE 3 | 970° C. | 1.6 | — | 2.3 | 3.30 | 56.6 | 3830 | 2780 |
| COMPARATIVE EXAMPLE 10 | COMPARATIVE EXAMPLE 4 | 970° C. | 1.8 | — | 2.7 | 3.24 | 56.8 | 4220 | 3120 |
| COMPARATIVE EXAMPLE 11 | COMPARATIVE EXAMPLE 5 | 970° C. | 1.2 | 5.6 | 2.0 | 3.48 | 55.9 | 3770 | 2650 |
| COMPARATIVE EXAMPLE 12 | COMPARATIVE EXAMPLE 6 | 750° C. | 1.2 | 5.3 | 2.1 | 3.56 | 55.4 | 2760 | 2030 |

| | PELLET MFR (FC-92 wt %) [g/10 min] | MOLDED PRODUCT Br [G] | iHc [Oe] | BHmax [MGOe] |
|---|---|---|---|---|
| EXAMPLE 12 | 106 | 3100 | 2260 | 2.28 |
| EXAMPLE 13 | 110 | 3080 | 2140 | 2.24 |
|  | — | — | — | — |
|  | — | — | — | — |
|  | — | — | — | — |
|  | — | — | — | — |
|  | — | — | — | — |
| EXAMPLE 14 | 130 | 3040 | 2460 | 2.22 |
|  | — | — | — | — |
| EXAMPLE 15 | 161 | 3180 | 2620 | 2.46 |
| EXAMPLE 16 | 158 | 3180 | 2600 | 2.47 |
| EXAMPLE 23 | 161 | 3240 | 2170 | 2.57 |
| EXAMPLE 24 | 217 | 3270 | 2240 | 2.61 |

TABLE 5-continued

| | | | | |
|---|---|---|---|---|
| EXAMPLE 25 | 139 | 3150 | 2470 | 2.42 |
| EXAMPLE 26 | 115 | 3200 | 2190 | 2.52 |
| EXAMPLE 27 | 115 | 3170 | 2350 | 2.45 |
| EXAMPLE 28 | 137 | 3260 | 2150 | 2.60 |
| COMPARATIVE EXAMPLE 7 | 18 | NOT MOLDABLE | | |
| COMPARATIVE EXAMPLE 8 | 56 | 2760 | 2320 | 1.90 |
| COMPARATIVE EXAMPLE 9 | 8 | NOT MOLDABLE | — | — |
| COMPARATIVE EXAMPLE 10 | NOT KNEADABLE | — | — | — |
| COMPARATIVE EXAMPLE 11 | 71 | 2810 | 2350 | 1.93 |
| COMPARATIVE EXAMPLE 12 | 76 | 2740 | 1990 | 1.85 |

What is claimed is:

1. A ferrite powder for an anisotropic bonded magnet, having a particle diameter distribution with a plurality of peaks, and a compressed density (CD) of 3.5 g/cm$^3$ or more, intrinsic coercive force of compression moulding (p-iHc) of the ferrite powder being 2100 Oe or more, wherein
the ferrite powder for the anisotropic bonded magnet has a specific surface area (SSA) of 2.0 m$^2$/g or less.

2. The ferrite powder for an anisotropic bonded magnet according to claim 1, having a saturation magnetization value (σs) in a non-oriented state of 54 emu/g or more.

3. A ferrite powder for an anisotropic bonded magnet, having a particle diameter distribution with a plurality of peaks, a compressed density (CD) of 3.5 g/cm$^3$ or more, a specific surface area (SSA) of 2.0 m$^2$/g or less, and a saturation magnetization value (σs) in a non-oriented state of 54 emu/g or more intrinsic coercive force of compression moulding (p-iHc) of the ferrite powder being 2100 Oe or more.

4. The ferrite powder for an anisotropic bonded magnet according to claim 1, having a melt flow rate of 80 g/10 min or more as measured by a flowability test in which 92 percent by weight of the ferrite powder is used, the flowability test including:
(1) mixing 91.7 parts by weight of a magnetic powder for the test, 0.8 parts by weight of a silane coupling agent, 0.8 parts by weight of a lubricant, and 6.7 parts by weight of nylon-6 (in a powder form) using a mixer;
(2) kneading the obtained mixture at 230° C. to form a pellet having an average diameter of 2 mm; and
(3) supplying the pellet obtained in the above (2) to a melt flow indexer to measure a weight of the pellet extruded at 270° C. under a load of 10 kg in 10 minutes, the weight serving as the melt flow rate (unit: g/10 min).

5. A ferrite powder for an anisotropic bonded magnet, comprising:
a particle size distribution with a plurality of peaks;
a compressed density (CD) of 3.5 g/cm$^3$ or more;
a specific surface area (SSA) of 2.0 m$^2$/g or less; and
a saturation magnetization value (σs) in a non-oriented state of 54 emu/g or more,
an intrinsic coercive force of compression moulding (p-iHc) of the ferrite powder being 2100 Oe or more, and
having a melt flow rate of 80 g/10 min or more as measured by a flowability test when 91.7 percent by weight of the ferrite powder is used, the flowability test including:
(1) mixing 91.7 parts by weight of a magnetic powder for the test, 0.8 parts by weight of a silane coupling agent, 0.8 parts by weight of a lubricant, and 6.7 parts by weight of nylon-6 (in a powder form) using a mixer;
(2) kneading the obtained mixture at 230° C. to form a pellet having an average diameter of 2 mm; and
(3) supplying the pellet obtained in the above (2) to a melt flow indexer to measure a weight of the pellet extruded at 270° C. under a load of 10 kg in 10 minutes, the weight serving as the melt flow rate (unit: g/10 min).

6. The ferrite powder for an anisotropic bonded magnet according to claim 1, having coercive force iHc of 2100 Oe or more measured using 92 percent by weight of the ferrite powder, the coercive force iHc being measured by:
(1) mixing 91.7 parts by weight a magnetic powder for the test, 0.8 parts by weight of a silane coupling agent, 0.8 parts by weight of a lubricant, and 6.7 parts by weight of nylon-6 (in a powder form) using a mixer;
(2) kneading the obtained mixture at 230° C. to form a pellet having an average diameter of 2 mm; and
(4) subjecting the pellet to injection-molding at a temperature of 290° C. and a molding pressure of 85 kgf/cm$^2$ in an orientation magnetic field of 4.3 kOe to form a cylindrical molded product having a diameter of 15 mm and a height of 8 mm, where an orientation direction of the magnetic field is along a center axis of the cylinder, and then measuring magnetic properties of the molded product using a BH tracer.

7. An anisotropic bonded magnet using a ferrite powder according to claim 1.

8. The anisotropic bonded magnet according to claim 7, wherein coercive force (inj-iHc) of a molded product measured in (4) is 2100 Oe or more.

9. The anisotropic bonded magnet according to claim 7, wherein a maximum energy product (inj-BHmax) of the molded product measured in (4) is 2.2 MGOe or more.

10. Ferrite powders for an anisotropic bonded magnet, comprising:
a particle size distribution has a plurality of peaks;
a compressed density (CD) is 3.5 g/cm$^3$ or more;
intrinsic coercive force of compression moulding (p-iHc) is 2,100 Oe or more;
a specific surface area (SSA) is 2.0 m$^2$/g or less;
saturation magnetization (σs) in a non-oriented state is 54 emu/g or more;
a melt flow rate is 80 g/10 min as measured by a flowability test in which 92 percent by weight of a ferrite powder is used, the flowability test including:
(1) mixing 91.7 parts by weight of a magnetic powder for the test, 0.8 parts by weight of a silane coupling agent, 0.8 parts by weight of a lubricant, and 6.7 parts by weight of nylon-6 (in a powder form) using a mixer;

(2) kneading the obtained mixture at 230° C. to form a pellet having an average diameter of 2 mm (a pulverized product of a compound);
(3) supplying the pellet obtained in the above (2) to a melt flow indexer to measure a weight of the pellet extruded at 270° C. under a load of 10 kg in 10 minutes, the weight serving as the melt flow rate (unit: g/10 min); and a maximum energy product of a molded product measured is 2.2 MGOe or more in the following:
(4) subjecting the pellet to injection-molding at a temperature of 290° C. and a molding pressure of 85 kgf/cm$^2$ in an orientation magnetic field of 4.3 kOe to form a cylindrical molded product having a diameter of 15 mm and a height of 8 mm, where an orientation direction of the magnetic field is along a center axis of the cylinder, and then measuring magnetic properties of the molded product using a BH tracer.

* * * * *